United States Patent Office 2,938,028
Patented May 24, 1960

2,938,028

PURIFYING AND DEWAXING CITRUS OILS

William C. Platt, Glendora, and Arthur L. Poston and Robert L. Mills, Ventura, Calif., assignors to Ventura Processors, Ventura, Calif., a corporation of California No Drawing. Filed Oct. 15, 1956, Ser. No. 615,739

5 Claims. (Cl. 260—236.6)

This invention relates to a process for purifying and dewaxing citrus oils and in particular to a process which may be used to remove waxy substances from the citrus oil to any desired degree of completeness, while also removing certain undesirable flavoring constituents originally present in the citrus oils.

One object of the invention is to provide a process for treating citrus oils which removes the waxy impurities to the degree of completeness required in the ultimate use of the oil. Another object is to provide a dewaxing process for citrus oils which facilitates the removal of waxy substances by chilling. Another object is to provide means for removing $\alpha$ and $\beta$ pinene from citrus oil, either simultaneously with the removal of all or a selected portion of the wax, or as a refining operation for citrus oil where wax removal is not involved.

These and other objects are attained by our invention which will now be described in detail.

Citrus oils, and particularly citrus oils recovered by methods involving the abrasion of the rind, which introduces maximum amounts of wax into the recovered oil, cannot be economically or satisfactorily dewaxed by simply cooling and separating out the wax crystals, because much of the wax does not crystallize or separate by a simple chilling procedure, and because so much oil is entrained in the separated wax. Furthermore, for certain uses of the citrus oil, it is not necessary that every trace of wax be removed, and in some uses a little wax is even desirable to give a slight cloud, as in certain chilled drinks.

We have discovered that by diluting the oil with an alcohol solvent in relatively large amounts, followed by a chilling, the wax may be thrown out of solution to a degre of completeness dependent upon the temperature of chilling; and then after separating the separated wax from the liquid by filtration or centrifuging, the alcohol solvent is fractionally distilled from the purified oil. We have further discovered that alcohol solvent forms complex azeotropic mixtures, with $\alpha$ and $\beta$ pinene (and traces of limonene), and these sometimes undesirable impurities may thus be removed from citrus oil without the requirement of re-distillation of the citrus oil.

As an example illustrating this invention, 100 gallons of crude lemon oil was mixed with 300 gallons of azeotropic isopropyl alcohol and water (91 percent alcohol) solution. The mixture was chilled to 20° F., which caused separation of some of the wax. A little diatomaceous earth filter aid, about one-half percent based upon the total liquid, was mixed in, and the mixture filtered. The filtered solution was then fractionally distilled in a vacuum still operating at about 105° F., from which the oil, and the azeotropic mixture of isopropyl alcohol, water, $\alpha$ pinene, and $\beta$ pinene, were recovered. The azeotropic mixture contains, in addition to the alcohol and water, about 6 percent of $\alpha$ and $\beta$ pinene, and a trace of limonene. As a final processing step for the citrus oil from the distillation, the oil was washed with water to remove any residual alcohol. This was easily accomplished by feeding separate streams of water and the citrus oil to a centrifuge, and recovering the washed oil, which was substantially free from wax, alcohol, $\alpha$ pinene, $\beta$ pinene, and limonene. The final water washing is desirable but is not always necessary.

When the pinenes and limonene are not to be removed from the crude lemon oil, the citrus oil is dissolved in the complex azeotropic mixture (containing alcohol, water, $\alpha$ pinene, $\beta$ pinene, and limonene) which was recovered by fractional vacuum distillation from a previous batch as described above.

The $\alpha$ and $\beta$ pinene and limonene may be removed from citrus oils without the removal of wax, or from oils which have been dewaxed by other processes, by dissolving the oil in the alcohol, preferably the azeotropic mixture with water, fractionally distilling to separate the citrus oil from the complex azeotropic mixture containing the alcohol, water, pinenes and limonene, and then optionally, washing the purified oil with water to remove any last traces of alcohol.

An azeotropic solution (95 percent) of ethyl alcohol and water may also be used in place of the above azeotropic isopropyl alcohol solution, the proportions being about the same, one volume of oil to three volumes of the azeotropic alcohol solution. Also, the azeotropic mixture of ethyl alcohol, water, pinene and limonene may be prepared and used where it is not desired to remove the $\alpha$ and $\beta$ pinenes and the limonene, as described for isopropyl alcohol.

Absolute methyl alcohol may also be used, but the proportions to be used are about one volume of oil to six volumes of alcohol, this being necessary to get all of the oil dissolved in the alcohol. The use of methyl alcohol gives the advantage that the chilled solutions are less viscous than is the case with the other alcohols. The azeotropic mixture of methyl alcohol, $\alpha$ pinene, $\beta$ pinene, and limonene may also be prepared and used, as described above, where it is not desired to remove the pinenes and limonene.

Other low temperature boiling alcohols in which the citrus oil is soluble may be used, including besides the above, propyl alcohol.

The proportions of oil and alcohol solvent are critical to the extent that there must be sufficient alcohol to keep the citrus oil in solution before and after the chilling operation.

The degree of chilling may be selected to produce a final product of the selected wax content. For certain purposes, merely adding the alcohol solvent to the oil causes a separating out of enough of the wax so that after filtering, the liquid yields, by fractional vacuum distillation, an oil of acceptably low wax content. On the other hand, chilling to —35° F. to —40° F. seperates out substantially all of the wax, and a wax-free oil is recovered, after chilling, filtration and fractional distillation.

The alcohol solvent for use in this process need not contain water or be of the exact azeotropic proportions, but azeotropic mixtures are preferred for convenience in processing.

This process is equally applicable to other citrus oils such as orange oil, grapefruit oil, tangerine oil and the like, with suitable variations in the proportions of the alcohol solvent to effect the required removal of the wax and/or the pinene and limonene content, following the procedures given as applied specifically to lemon oil.

The advantages of this process are greater flexibility and lower costs of dewaxing. Where there is originally a large amount of wax, the chilled oils of the old art processes become so thick that handling, including centrifuging and filtration, is very difficult. Furthermore, the operation of the old processes at very low temperatures around —40° F. is difficult because of atmospheric moisture condensation, as well as costly for refrigeration and in the time consumed in processing. The use of higher chilling temperatures reduces direct costs and increases productive capacity, and as explained, permits dewaxing to the degree of completeness necessary for the particular end use of the citrus oil. The removal of the off-flavored α pinene, β pinene and limonene from citrus oil by the simple process herein described provides a high quality of citrus oil free from these undesirable odors and flavors.

Where the expression "alcohol solvent" is used in the appended claims, there is meant to be included as alternative solvents, methanol; ethanol; propanol; isopropanol; an azeotropic mixture of ethanol and water; an azeotropic mixture of water and propanol; an azeotropic mixture of water and isopropanol; an azeotropic mixture of methanol, α pinene, β pinene and limonene; an azeotropic mixture of water, ethanol, α pinene, β pinene, and limonene; and azeotropic mixture of water, propanol, α pinene, β pinene, and limonene; and an azeotropic mixture of water, isopropanol, α pinene, β pinene and limonene.

We claim:

1. The process of removing undesired impurities from an impure citrus oil comprising the step of dissolving the impure oil in a solvent selected from the group consisting of methanol; ethanol; propanol; isopropanol; an azeotropic mixture of ethanol and water; an azeotropic mixture of water and propanol; an azeotropic mixture of methanol, α pinene, β pincne and limonene; an azeotropic mixture of water, ethanol, α pinene, β pinene, and limonene; an azeotropic mixture of water, propanol, α pinene, β pinene, and limonene; and an azeotropic mixture of water, isopropanol, α pinene, β pinene, and limonene; chilling the said solution to crystallize out the wax; separating the wax from the chilled solution; and fractionally distilling the solution to separate the citrus oil and the said solvent.

2. The process of removing waxy substances from an impure citrus oil without removing α pinene, β pinene and limonene therefrom, comprising the steps of dissolving the oil in about 3 volumes of an azeotropic solution containing an alcohol, selected from the group consisting of ethanol, propanol and isopropanol, water, α pinene, β pinene, and limonene; chilling the solution to a sufficiently low temperature to crystallize out the desired proportion of the wax; filtering out the separated wax from the chilled solution; and fractionally distilling to separate the citrus oil and the azeotropic solution of the selected alcohol, water, α pinene, β pinene, and limonene.

3. The process of removing waxy substances from an impure citrus oil without removing α pinene, β pinene and limonene therefrom comprising the steps of dissolving the oil in about 6 volumes of an azeotropic solution containing methyl alcohol, α pinene, β pinene, and limonene; chilling the oil-alcohol solution to a sufficiently low temperature to crystallize out the desired proportion of the wax; filtering out the separated wax from the chilled solution, and fractionally distilling to separate the citrus oil from the azeotropic solution of methyl alcohol, α pinene, β pinene, and limonene.

4. The process of removing undesired impurities from an impure citrus oil, comprising the steps of dissolving one part by volume of the oil in about 3 volumes of an azeotropic solution of water and an alcohol selected from the group consisting of ethanol, isopropanol, and propanol; chilling the oil alcohol solution to crystallize out the wax; separating the wax from the chilled solution; and fractionally distilling the solution to separate the citrus oil and the alcohol solvent.

5. The process of removing undesired impurities from an impure citrus oil, comprising the steps of dissolving one part by volume of the oil in about 6 volumes of methanol; chilling the oil alcohol solution to crystallize out the wax; separating the wax from the chilled solution; and fractionally distilling the solution to separate the citrus oil and the alcohol solvent.

References Cited in the file of this patent

UNITED STATES PATENTS 2,154,713    Van Wijk et al.  --------  Apr. 18, 1939